June 19, 1962  I. R. BARR  3,039,757
BUFFER
Filed April 28, 1960

INVENTOR.
IRWIN R. BARR
BY

ATTORNEY 3,039,757
BUFFER
Irwin R. Barr, Lutherville, Md., assignor to Aircraft Armaments, Inc., Cockeysville, Md., a corporation of Maryland
Filed Apr. 28, 1960, Ser. No. 25,403
3 Claims. (Cl. 267—1)

This invention relates to buffers and, more particularly, to buffers of the type which will produce an inelastic collision for completely absorbing impulse loads.

Designers are frequently faced with a requirement for halting a rapidly moving body at a certain point in its path in such a manner that the body neither substantially moves from the point nor oscillates thereabout. The provision of a device which produce a perfectly inelastic collision when contacted by the body is required. In such device, all of the kinetic energy of the moving body is absorbed by the device and none is returned to the body.

This invention provides for an inelastic collision by utilizing rubber discs which, when axially compressed by the body, are radially expandable and by providing means which restrain radial expansion of the discs when they are axially compressed by the body. By preventing such radial expansion, radial forces are built up in the rubber discs which are directly proportional to the axial forces applied to the discs by the body. Such radial forces operate on the restraining means as normal forces and produce axial frictional forces between the discs and the restraining means that are directly proportional to the normal forces. Such functional forces oppose the axial force applied to the discs by the body. Since creation of the frictional forces is dependent upon axial compression of the rubber discs, not all of the kinetic energy of the body is dissipated in friction, and a small amount of energy is returned to the body during the collision, but the energy returned as the discs resiliently return to their unstressed condition that existed prior to collision is negligible compared to the energy dissipated during the collision.

The more important features of this invention have thus been outlined rather broadly in order that the detailed description thereof that follows may be better understood, and in order that the contribution to the art may be better appreciated. There are, of course, additional features of the invention that will be described hereinafter and which will also form the subject of the claims appended hereto. Those skilled in the art will appreciate that the conception upon which this disclosure is based may readily be utilized as a basis for designing other structures for carrying out the several purposes of this invention. It is important, therefore, that the claims to be granted herein shall be of sufficient breadth to prevent the appreciation of this invention by those skilled in the art.

Figure 1:
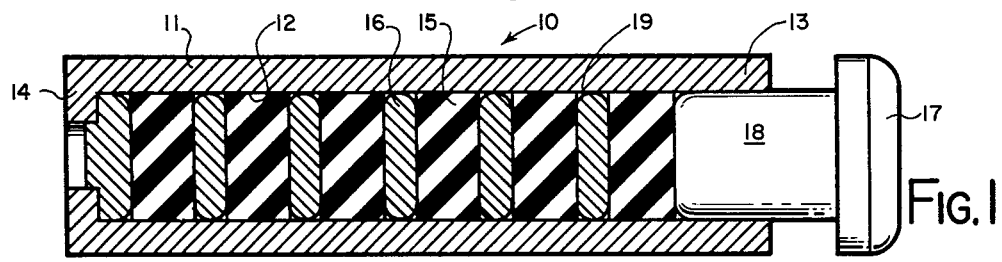
FIGURE 1 is a cross-section of one embodiment of the invention showing the suffer before a load is applied.

A buffer constructed in accordance with this invention is designated generally at 10 in FIGURE 1. Buffer 10 includes housing 11 having cylindrical bore 12. Housing 11 has one end 13 that is open. The other end is closed as at 14. A plurality of rubber discs 15 are inserted in bore 12. A plurality of metal discs 16 are inserted in the bore between discs 15. Each of the discs is substantially the same diameter as the bore. The discs are alternatingly stacked along the axis of the bore by sliding the discs through open end 13 until the bore is almost filled. Plunger 17 having rod 18 of substantially the same diameter as the bore is inserted in the open end 13.

Figure 5:
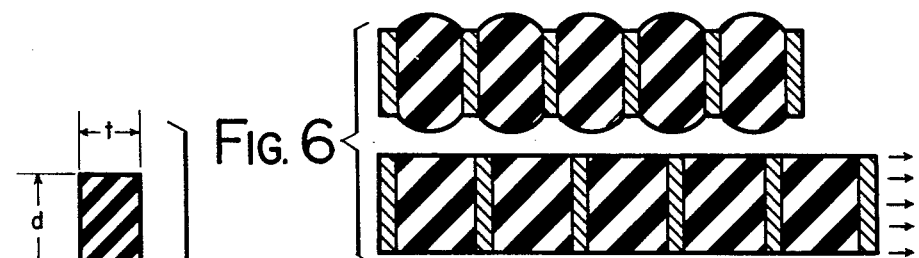
FIGURE 5 is a cross-section of a rubber disc showing an unstressed and stressed condition.

As described above, rubber discs 15 are substantially the same diameter as the bore. By this, it is intended to mean that the discs lightly engage bore 13 so that the discs may slide along the bore by applying a light but steady push. Referring now to FIGURE 5, a rubber disc 15 is shown under different conditions. In one condition, the diameter of the disc is "$d$" and the thickness is "$t$." When an axial load is applied to the disc it is axially compressed to a thickness "$t-\Delta t$." This axial compression causes radial enlargement of the disc to a diameter "$d+\Delta d$." The incremental decrease in thickness is related to the incremental increase in diameter by Poisson's ratio for the material. When restraining means prevent radial expansion of the rubber in response to axial compression, internal radial forces are built up in the rubber. Such radial forces are thus directly proportional (through Poisson's ratio) to the axial force causing the axial compression. Such radial forces act normal to the restraining means giving rise to axial frictional forces directed opposite to the axial force causing axial compression. The frictional forces are directly proportional (through the coefficient of friction between the discs and the restraining means) to the radial forces which, in turn, are directly proportional to the applied load. An increase in the applied load causes an increase in the radial rubber forces which causes an increase in the frictional forces resisting the applied load.

Figure 2:
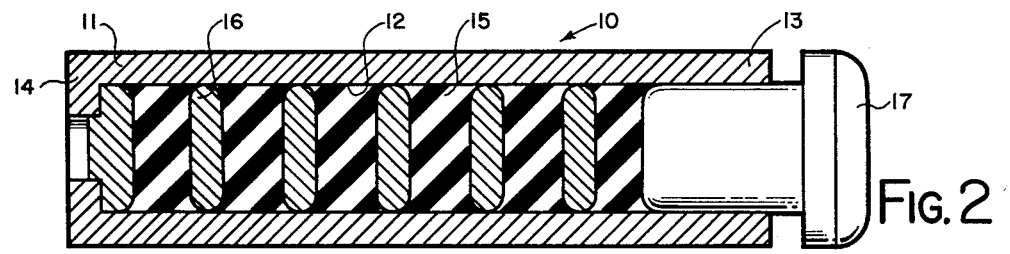
FIGURE 2 is a cross-section similar to FIGURE 1, but showing the buffer as a load is applied.

For extremely large applied loads, it is desirable to utilize many small rubber discs instead of a single large disc, and this is illustrated in FIGURES 1 and 2. Interference between rubber discs is prevented by metallic washers 16 which seal the rubber washers in a certain volume in the bore and prevent extrusion of the rubber upon the application of loads to plunger 17. To keep the internal stress induced in the rubber discs to a reasonable level, limited expansion of the rubber is provided for by rounding the corners of disc 16 as at 19. No particular value of radius is necessary and a straight chamfer can be utilized. It may be desirable to make the volume of space provided for by the rounded corners substantially equal to the change in rubber volume which arises upon axial compression of the rubber disc. The effect of this is shown in FIGURE 2.

While the embodiment illustrated in FIGURES 1 and 2 utilizes closed end 14 to back up the stack of rubber and metallic discs, it is possible to dispense with such closed end. This can be accomplished by increasing the number of discs until the mass thereof is sufficient to inertially resist high accelerations applied thereto by the plunger. When a load is applied to the axially stacked discs, as for example, when a body moving at a high rate of speed strikes the plunger, the stacked discs remote from the discs adjacent the plunger tend to remain stationary, causing the adjacent discs to be axially deflected thereby causing a resisting frictional force to be built up therein. The creation of the resisting frictional force increases the tendency to remain stationary which, in turn, increases the resisting frictional force in such a manner that the impulse (force times the time through which it acts) applied to the plunger is absorbed with very small axial deflection of the rubber discs.

Figure 3:
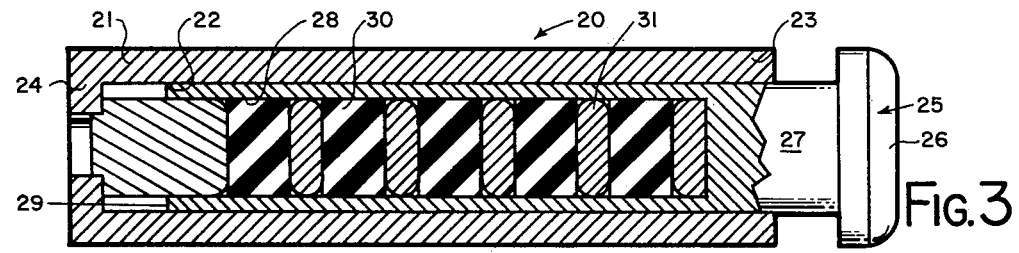
FIGURE 3 is a cross-section of another embodiment of the invention.

Another embodiment of the invention is shown in FIGURE 3 and is indicated generally at 20. Buffer 20 has housing 21 with cylindrical bore 22, open end 23 and closed end 24. Slideably mounted in open end 23 of bore 22 is plunger 25 which has an enlarged head 26 projecting from the open end. Plunger 25 has rod 27 of substantially the same diameter as bore 22. Rod 27 has axial opening 28 therein interconnecting with free end 29 which is normally spaced from closed end 24 of housing 21. Alternating discs of rubber 30 and metal 31 are slideably engaged in axial opening 28.

When a load is applied to plunger 25, axial compression of rubber discs 30 occurs accompanied by a build-up of radial forces in the rubber as radial expansion is prevented by the walls defining opening 28 in rod 27. As above described, the radial forces give rise to axial frictional forces, this time acting between the rubber and the plunger.

Figure 4:
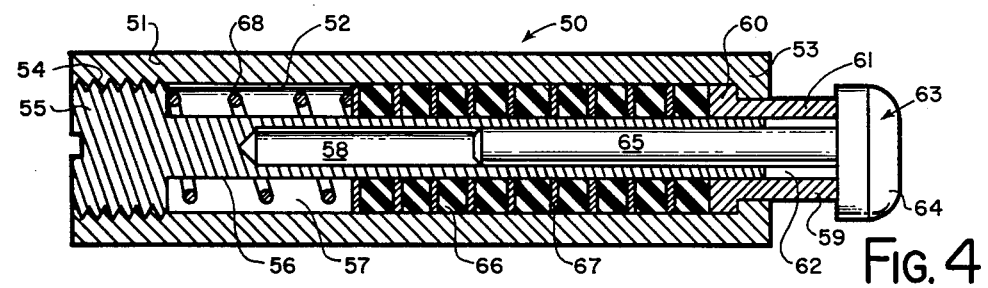
FIGURE 4 is a cross-section of still another embodiment of the invention.

Still another embodiment of the invention is illustrated in FIGURE 4 wherein the buffer is designated generally at 50, and includes housing 51 having cylindrical bore 52 with inturned flange 53 at one end and internally threaded as at 54 on the opposite end. Plug 55 is screwed onto threads 54 to close the opposite end of the housing. Plug 55 has an axially extending portion 56 of a diameter smaller than the bore to define an annular recess 57. Portion 56 terminates short of flange 53 and is provided with axial opening 58. Bushing 59 has an enlarged portion 60 of substantially the same diameter as bore 52 and a reduced portion 61 of substantially the same diameter as the opening defined by flange 53. Bushing 59 is also provided with axial recess 62 of substantially the same diameter as the outside diameter of portion 56 of plug 55. Plunger 63 has an enlarged head 64 that bears against portion 61 of bushing 59 and a rod 65 of substantially the same diameter as opening 58 engaged therein. With this arrangement, movement of plunger 63 imparts movement to bushing 59 to decrease the volume of annular recess 57 as rod 65 slides in opening 58. Stacked in annular recess 57 is a plurality of toroidal discs of rubber 66 and metal 67 which are alternatingly arranged along the axis of the bore. Discs 66, 67 have an outside diameter substantially the same as the diameter of bore 52 and an inside diameter of substantially the same as the diameter of portion 56. Interposed between the threaded portion of plug 55 and the stacked discs is helical spring 68.

In operation, the application of a load to plunger 63 initially causes bushing 59 to slightly compress the rubber discs closest to bushing 59 due to the effect of spring 68 acting on the discs. As above described, the frictional forces so created tend to prevent further movement of the discs and thus cause additional axial compression which creates further frictional forces until all of the energy applied to the plunger is dissipated by the frictional forces.

Figure 6:
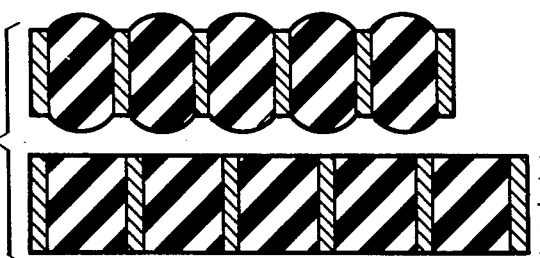
FIGURE 6 is a cross-section of a configuration that is used to prestress the rubber discs.

The rubber discs may be prestressed in the manner illustrated in FIGURE 6. Here, discs of rubber are bonded to metallic discs such that in unstressed condition of the rubber discs, the major diameter of the rubber exceeds that of the metal. When a tensile load is applied to the end metallic discs, the length of the configuration increases while the major diameter of the rubber decreases to that of the metallic discs. In this condition the stretched configuration can be placed in a housing whose bore is the same as the diameter of the discs. Upon release of the tensile loads, the bore will restrain the rubber against its return to its unstressed condition thereby creating radial forces between the rubber and housing which will resist axial displacement of the configuration in the housing.

Those skilled in the art will appreciate that this invention achieves the absorption of large amounts of energy that is frictionally dissipated in a highly inelastic collision.

What is claimed is:

1. A method for making a buffer having a housing with a cylindrical bore open at one end and a plunger slidably mounted in the open end of the bore for axial movement therein comprising, forming discs of rubber which have a diameter exceeding the diameter of said bore and discs of metal which have a diameter substantially the same as that of said bore and which can slidably move therein, bonding said discs of rubber to said discs of metal in alternating layers to form a resilient configuration, applying a tensile load to said configuration to increase the spacing between metal discs and decrease the diameter of said rubber discs until said configuration is of substantially the same diameter as said bore, inserting said configuration in said bore while said configuration is under said tensile load, and releasing said tensile load from said configuration whereby said rubber discs expand against said bore and provide a prestressed resilient cushion against which said plunger is operable.

2. A buffer comprising a housing having a cylindrical bore open at one end, a resilient configuration of alternating discs of rubber and metal inserted in said bore, said rubber discs being bonded to said metal discs, and a plunger slidably mounted in the open end of said bore for axial movement therein, said plunger abutting said configuration, said rubber discs frictionally engaging said bore when no load has been applied to said configuration by said plunger whereby said configuration provides a prestressed resilient cushion that resists axial movement in the bore when acted upon by said plunger.

3. A buffer comprising a housing having a cylindrical bore open at one end, a resilient configuration of alternating discs of rubber and metal slidably mounted in and engaged with said bore for axial movement therein, a plunger slidably mounted in the open end of said bore for axial movement therein, said plunger abutting one end of said configuration, and spring means interposed between the other end of said configuration and said housing for causing radial expansion of the rubber discs into frictional engagement with said bore that resiliently resists further axial displacement of said configuration in response to initial axial displacement when a load is applied to said plunger.

References Cited in the file of this patent

UNITED STATES PATENTS

| | | |
|---|---|---|
| 7,706 | Ray | Oct. 8, 1850 |
| 1,679,698 | Weydert | Aug. 7, 1928 |
| 2,010,623 | Bugatti | Aug. 6, 1935 |
| 2,263,599 | Tucker | Nov. 25, 1941 |
| 2,665,902 | Allen | Jan. 12, 1954 |
| 2,684,160 | Dentler | July 20, 1954 |
| 2,946,462 | Danielson | July 26, 1960 |

FOREIGN PATENTS

| | | |
|---|---|---|
| 70,249 | France | Nov. 10, 1958 |
| | (1st addition to 1,110,107) | |